(12) United States Patent
Rozenshtein et al.

(10) Patent No.: US 6,959,301 B2
(45) Date of Patent: Oct. 25, 2005

(54) MAINTAINING AND RECONSTRUCTING THE HISTORY OF DATABASE CONTENT MODIFIED BY A SERIES OF EVENTS

(75) Inventors: David Rozenshtein, Syosset, NY (US); Sandip K. Mehta, Central Islip, NY (US)

(73) Assignee: Reuters Limited, (GB)

( * ) Notice: Subject to any disclaimer, the term of this patent is extended or adjusted under 35 U.S.C. 154(b) by 533 days.

(21) Appl. No.: 09/876,993

(22) Filed: Jun. 11, 2001

(65) Prior Publication Data

US 2002/0087271 A1 Jul. 4, 2002

Related U.S. Application Data

(60) Provisional application No. 60/259,513, filed on Jan. 4, 2001.

(51) Int. Cl.⁷ ............................................... G06F 7/00
(52) U.S. Cl. .................... 707/101; 707/100; 707/104.1
(58) Field of Search .......................... 707/1–203, 204, 707/206, 100–104.1; 710/1, 19; 711/4, 100, 711/111, 207

(56) References Cited

U.S. PATENT DOCUMENTS

| | | | | |
|---|---|---|---|---|
| 5,170,464 A | * | 12/1992 | Hayes et al. ................... 706/60 |
| 5,222,235 A | * | 6/1993 | Hintz et al. ................... 707/101 |
| 5,758,355 A | * | 5/1998 | Buchanan ................... 707/201 |
| 5,806,075 A | * | 9/1998 | Jain et al. ................... 707/201 |
| 5,812,840 A | * | 9/1998 | Shwartz ......................... 707/4 |
| 6,003,022 A | * | 12/1999 | Eberhard et al. .............. 707/2 |
| 6,115,704 A | * | 9/2000 | Olson et al. .................... 707/3 |
| 6,122,640 A | * | 9/2000 | Pereira ................... 707/103 R |
| 6,144,970 A | * | 11/2000 | Bonner et al. ............... 707/206 |
| 6,185,555 B1 | * | 2/2001 | Sprenger et al. ................ 707/3 |
| 6,212,529 B1 | * | 4/2001 | Boothby et al. ............ 707/201 |
| 6,226,710 B1 | * | 5/2001 | Melchoir .................... 711/108 |
| 6,330,568 B1 | * | 12/2001 | Boothby et al. ............. 707/201 |
| 6,363,387 B1 | * | 3/2002 | Ponnekanti et al. .......... 707/10 |
| 6,381,644 B2 | * | 4/2002 | Munguia et al. ............ 709/225 |
| 6,457,021 B1 | * | 9/2002 | Berkowitz et al. .......... 707/201 |
| 6,502,133 B1 | * | 12/2002 | Baulier et al. .............. 709/224 |
| 6,519,613 B1 | * | 2/2003 | Friske et al. ................. 707/202 |
| 6,529,921 B1 | * | 3/2003 | Berkowitz et al. ....... 715/500.1 |
| 6,647,510 B1 | * | 11/2003 | Ganesh et al. ................. 714/16 |
| 2001/0000536 A1 | * | 4/2001 | Tarin .......................... 707/102 |
| 2002/0007363 A1 | * | 1/2002 | Vaitzbilt ..................... 707/202 |

FOREIGN PATENT DOCUMENTS

EP 503768 A1 * 9/1992 ............. G06F 3/06

OTHER PUBLICATIONS

Grey et al. , "The Recovery Manager of the System R Database Manager", ACM, 1981, pp. 223-242.*

* cited by examiner

*Primary Examiner*—Luke S Wassum
*Assistant Examiner*—Linh Black
(74) *Attorney, Agent, or Firm*—Banner & Witcoff, Ltd.

(57) ABSTRACT

A method and a system for maintaining the history of database content when the database is modified by a sequence of events, where each event may be one of a load or a load retraction, is provided. The inventive system and method can reconstruct the state of a database as it existed at a discrete time between two successive historical events without repeating each event in the historical event sequence. A table containing deleted row information and a table containing historical information are maintained as the target table is updated to more quickly recreate historical states of the target table.

15 Claims, 20 Drawing Sheets

Step 1: Load from X where:

X = 
| K | A | B |
|---|---|---|
| k1 | a11 | b11 |
| k2 | a21 | b21 |

Step 2: Load from X where:

X = 
| K | A | B |
|---|---|---|
| k1 | a12 | b12 |
| k3 | a31 | b31 |

Step 3: Load from Y where:

Y = 
| K | B | C |
|---|---|---|
| k1 | b12 | c11 |

Step 4: Load from Y where:

Y = 
| K | B | C |
|---|---|---|
| k1 | b12 | c12 |
| k2 | b22 | c22 |

Step 5: Retract load of Step 2.

Step 6: Retract load of Step 1.

Step 7: Load from X where:

| T = | K | A | B | C |
|---|---|---|---|---|
| | k1 | a11 | b11 | NULL |
| | k2 | a21 | b21 | NULL |

Figure 2A

| T = | K | A | B | C |
|---|---|---|---|---|
| | k1 | a12 | b12 | NULL |
| | k3 | a31 | b31 | NULL |

Figure 2B

| T = | K | A | B | C |
|---|---|---|---|---|
| | k1 | a12 | b12 | c11 |

Figure 2C

| T = | K | A | B | C |
|---|---|---|---|---|
| | k1 | a12 | b12 | c12 |
| | k2 | a21 | b22 | c22 |

Figure 2D

1) T after Load 1:

T = 
| K | A | B | C |
|---|---|---|---|
| k1 | a11 | b11 | NULL |
| k2 | a21 | b21 | NULL |

2) T after Load 3:

T = 
| K | A | B | C |
|---|---|---|---|
| k1 | a11 | b12 | c11 |

3) T after Load 4:

1) T after Load 3:

T = 
| K | A | B | C |
|---|---|---|---|
| k1 | NULL | b12 | c11 |

2) T after Load 4:

T = 
| K | A | B | C |
|---|---|---|---|
| k1 | NULL | b12 | c12 |
| k2 | NULL | b22 | c22 |

1) T after Load 3:

| K | A | B | C |
|---|---|---|---|
| k1 | NULL | b12 | c11 |

2) T after Load 4:

| K | A | B | C |
|---|---|---|---|
| k1 | NULL | b12 | c12 |
| k2 | NULL | b22 | c22 |

3) T after Load 7

| K | A | B | C |
|---|---|---|---|
| k1 | a11 | b12 | c12 |

Figure 3

1) T after Load 1

| T = | K | A | B | C |
|---|---|---|---|---|
| | k1 | a11 | b11 | NULL |
| | k2 | a21 | b21 | NULL |

2) T after Load 3:

| T = | K | A | B | C |
|---|---|---|---|---|
| | k1 | a11 | b12 | c11 |

3) T after Load 4:

| T = | K | A | B | C |
|---|---|---|---|---|
| | k1 | a11 | b12 | c12 |
| | k2 | a21 | b22 | c22 |

Figure 4

1) T after Load 1:

| T = | K | A | B | C |
|---|---|---|---|---|
| | k1 | a11 | b11 | NULL |
| | k2 | a21 | b21 | NULL |

2) T after Load 2:

| T = | K | A | B | C |
|---|---|---|---|---|
| | k1 | a12 | b12 | NULL |
| | k3 | a31 | b31 | NULL |

3) T after Load 3:

| T = | K | A | B | C |
|---|---|---|---|---|
| | k1 | a12 | b12 | c11 |

Figure 5

| HT = | K | SR | A | SA | B | SB | C | SC | L | R |
|---|---|---|---|---|---|---|---|---|---|---|
| | k1 | A | a11 | A | b11 | A | NULL | N | 1 | NULL |
| | k2 | A | a21 | A | b21 | A | NULL | N | 1 | NULL |

| DT = | K | A | B | C |
|---|---|---|---|---|
| | | | | |

| K | SR | A | SA | B | SB | C | SC | L | R |
|---|----|---|----|---|----|----|----|---|---|
| k1 | A | a11 | A | b11 | A | NULL | N | 1 | NULL |
| k1 | A | a12 | A | b12 | A | NULL | N | 2 | NULL |
| k2 | A | a21 | A | b21 | A | NULL | N | 1 | NULL |
| k2 | D | NULL | D | NULL | D | NULL | D | 2 | NULL |
| k3 | A | a31 | A | b31 | A | NULL | N | 2 | NULL |

DT =

| K | A | B | C |
|---|---|---|---|
| k2 | a21 | b21 | NULL |

| K | SR | A | SA | B | SB | C | SC | L | R |
|---|----|---|----|---|----|----|----|---|---|
| k1 | A | a11 | A | b11 | A | NULL | N | 1 | NULL |
| k1 | A | a12 | A | b12 | A | NULL | N | 2 | NULL |
| k1 | A | NULL | N | NULL | C | c11 | A | 3 | NULL |
| k2 | A | a21 | A | b21 | A | NULL | N | 1 | NULL |
| k2 | D | NULL | D | NULL | D | NULL | D | 2 | NULL |
| k2 | D | NULL | D | NULL | D | NULL | D | 3 | NULL |
| k3 | A | a31 | A | b31 | A | NULL | N | 2 | NULL |
| k3 | D | NULL | D | NULL | D | NULL | D | 3 | NULL |

DT =

| K | A | B | C |
|---|---|---|---|
| k2 | a21 | b21 | NULL |
| k3 | a31 | b31 | NULL |

Figure 6C

| HT = | K | SR | A | SA | B | SB | C | SC | L | R |
|---|---|---|---|---|---|---|---|---|---|---|
| | k1 | A | a11 | A | b11 | A | NULL | N | 1 | NULL |
| | k1 | A | a12 | A | b12 | A | NULL | N | 2 | NULL |
| | k1 | A | NULL | N | NULL | C | c11 | A | 3 | NULL |
| | k1 | A | NULL | N | NULL | C | c12 | A | 4 | NULL |
| | k2 | A | a21 | A | b21 | A | NULL | N | 1 | NULL |
| | k2 | D | NULL | D | NULL | D | NULL | D | 2 | NULL |
| | k2 | D | NULL | D | NULL | D | NULL | D | 3 | NULL |
| | k2 | A | NULL | N | b22 | A | c22 | A | 4 | NULL |
| | k3 | A | a31 | A | b31 | A | NULL | N | 2 | NULL |
| | k3 | D | NULL | D | NULL | D | NULL | D | 3 | NULL |
| | k3 | D | NULL | D | NULL | D | NULL | D | 4 | NULL |

| DT = | K | A | B | C |
|---|---|---|---|---|
| | k3 | a31 | b31 | NULL |

| K | SR | A | SA | B | SB | C | SC | L | R |
|---|---|---|---|---|---|---|---|---|---|
| k1 | A | a11 | A | b11 | A | NULL | N | 1 | NULL |
| k1 | A | a12 | A | b12 | A | NULL | N | 2 | 5 |
| k1 | A | NULL | N | b12 | A | c11 | A | 3 | NULL |
| k1 | A | NULL | N | NULL | C | c12 | A | 4 | NULL |
| k2 | A | a21 | A | b21 | A | NULL | N | 1 | NULL |
| k2 | D | NULL | D | NULL | D | NULL | D | 2 | 5 |
| k2 | D | NULL | D | NULL | D | NULL | D | 3 | NULL |
| k2 | A | NULL | N | b22 | A | c22 | A | 4 | NULL |
| k3 | A | a31 | A | b31 | A | NULL | N | 2 | 5 |
| k3 | D | NULL | D | NULL | D | NULL | D | 3 | NULL |
| k3 | D | NULL | D | NULL | D | NULL | D | 4 | NULL |

DT =

| K | A | B | C |
|---|---|---|---|
|   |   |   |   |

| K | SR | A | SA | B | SB | C | SC | L | R |
|---|----|---|----|---|----|---|----|---|---|
| k1 | A | a11 | A | b11 | A | NULL | N | 1 | 6 |
| k1 | A | a12 | A | b12 | A | NULL | N | 2 | 5 |
| k1 | A | NULL | N | b12 | A | c11 | A | 3 | NULL |
| k1 | A | NULL | N | NULL | C | c12 | A | 4 | NULL |
| k2 | A | a21 | A | b21 | A | NULL | N | 1 | 6 |
| k2 | D | NULL | D | NULL | D | NULL | D | 2 | 5 |
| k2 | D | NULL | D | NULL | D | NULL | D | 3 | NULL |
| k2 | A | NULL | N | b22 | A | c22 | A | 4 | NULL |
| k3 | A | a31 | A | b31 | A | NULL | N | 2 | 5 |
| k3 | D | NULL | D | NULL | D | NULL | D | 3 | NULL |
| k3 | D | NULL | D | NULL | D | NULL | D | 4 | NULL |

DH =

| K | A | B | C |
|---|---|---|---|
|   |   |   |   |

| K | SR | A | SA | B | SB | C | SC | L | R |
|---|---|---|---|---|---|---|---|---|---|
| k1 | A | a11 | A | b11 | A | NULL | N | 1 | 6 |
| k1 | A | a12 | A | b12 | A | NULL | N | 2 | 5 |
| k1 | A | NULL | N | b12 | A | c11 | A | 3 | NULL |
| k1 | A | NULL | N | NULL | C | c12 | A | 4 | NULL |
| k1 | A | a11 | A | NULL | C | NULL | N | 7 | NULL |
| k2 | A | a21 | A | b21 | A | NULL | N | 1 | 6 |
| k2 | D | NULL | D | NULL | D | NULL | D | 2 | 5 |
| k2 | D | NULL | D | NULL | D | NULL | D | 3 | NULL |
| k2 | A | NULL | N | b22 | A | c22 | A | 4 | NULL |
| k2 | D | NULL | D | NULL | D | NULL | D | 7 | NULL |
| k3 | A | a31 | A | b31 | A | NULL | N | 2 | 5 |
| k3 | D | NULL | D | NULL | D | NULL | D | 3 | NULL |
| k3 | D | NULL | D | NULL | D | NULL | D | 4 | NULL |

DH =

| K | A | B | C |
|---|---|---|---|
| k2 | NULL | b22 | c22 |

Figure 6G

```
/*
The code segments below are given with respect to the following example table
declarations (written, for specificity, in Transact SQL language of Microsoft
SQL Server).
These code segments are also just one possible implementation of the invention;
other implementations may also be developed.
These code segments are also primarily given with respect to loads from table X
and retracts of loads from table X; similar code segments may be developed for
loads and retracts from table Y.
*/

CREATE TABLE T (
      K char(2) NOT NULL,
      A char(3) NULL,
      B char(3) NULL,
      C char(3) NULL
      )

CREATE TABLE DT (
      K char(2) NOT NULL,
      A char(3) NULL,
      B char(3) NULL,
      C char(3) NULL
      )

CREATE TABLE HT (
      K char(2) NOT NULL,
      SR char(1) NOT NULL,
      A char(3) NULL,
      SA char(1) NOT NULL,
      B char(3) NULL,
      SB char(1) NOT NULL,
      C char(3) NULL,
      SC char(1) NOT NULL,
      L int NOT NULL,
      R int NULL
      )

CREATE TABLE X (
      K char(2) NOT NULL,
      A char(3) NULL,
      B char(3) NULL
      )

CREATE TABLE Y (
      K char(2) NOT NULL,
      B char(3) NULL,
      C char(3) NULL
      )

-- Code segment 1A
/*
This code segment is written to process loads from table X.
*/
INSERT INTO T (K, A, B)
SELECT K, A, B
FROM X
WHERE NOT EXISTS
```

Figure 8A

```
        (SELECT 1 FROM T WHERE K=X.K)
AND NOT EXISTS
        (SELECT 1 FROM DT WHERE K=X.K)
UNION
SELECT X.K, X.A, X.B, DT.C
FROM X, DT
WHERE X.K=DT.K
AND NOT EXISTS
        (SELECT 1 FROM T WHERE X.K)
-- End of code segment 1A -- Code segment 1B
/*
This code segment is written to process loads from table X.
*/
UPDATE T
SET A=X.A, B=X.B
FROM T, X
WHERE T.K=X.K
-- End of code segment 1B -- Code segment 1C
/*
This code segment is written to process loads from table X.
*/
DELETE FROM T
WHERE NOT EXISTS
        (SELECT 1 FROM X WHERE K=T.K)
-- End of code segment 1C -- Code segment 2A
/*
This code segment is written to process loads from table X.
This code segment assumes that table Inserted contains rows that were inserted
into T by code segment 1A.
Such table can be computed by application code, or may be made available
automatically by the system, as is the case in Microsoft SQL Server in an INSERT
trigger.
This code segment also assumes that integer variable @L has been declared and
initialized with the event id of the current load.
*/
INSERT INTO HT (L, SR, R, K, A, SA, B, SB, C, SC)
SELECT @L, 'A', NULL, K, A, 'A', B, 'A', NULL, 'N'
FROM Inserted
-- End of code segment 2A -- Code segment 2B
/*
This code segment is written to process loads from table X.
This code segment assumes that tables Inserted and Deleted both contain rows
that were updated in T by code segment 1B, where table Inserted contains new
values (after the UPDATE) and table Deleted contains old values (before UPDATE).
Such tables can be computed by application code, or may be made available
automatically by the system, as is the case in Microsoft SQL Server in an UPDATE
trigger.
This code segment also assumes that integer variable @L has been declared and
initialized with the event id of the current load.
*/
```

Figure 8B

```
INSERT INTO HT (L, SR, R, K, A, SA, B, SB, C, SC)
SELECT    @L,
          'A',
          NULL,
          I.K,
          CASE WHEN D.A=I.A THEN NULL ELSE I.A END,
          CASE WHEN D.A=I.A THEN 'C' ELSE 'A' END,
          CASE WHEN D.B=I.B THEN NULL ELSE I.B END,
          CASE WHEN D.B=I.B THEN 'C' ELSE 'A' END,
          NULL,
          'N'
FROM Inserted AS I, Deleted AS D
WHERE I.K=D.K
-- End of code segment 2B -- Code segment 2C
/*
This code segment assumes that table Deleted contains rows that were deleted
from T by code segment 1C.
Such table can be computed by application code, or may be made available
automatically by the system, as is the case in Microsoft SQL Server in a DELETE
trigger.
This code segment also assumes that integer variable @L has been declared and
initialized with the event id of the current load.
*/
INSERT INTO HT (L, SR, R, K, A, SA, B, SB, C, SC)
SELECT @L, 'D', NULL, K, NULL, 'D', NULL, 'D', NULL, 'D'
FROM Deleted
-- End of code segment 2C -- Code segment 2D
/*
This code segment is written to process loads from table X.
This code segment assumes that variable @L has been declared and initialized
with the event id of the current load.
*/
INSERT INTO HT (L, SR, R, K, A, SA, B, SB, C, SC)
SELECT @L, 'D', NULL, K, NULL, 'D', NULL, 'D', NULL, 'D'
FROM DT
WHERE NOT EXISTS
      (SELECT 1 FROM X WHERE K=DT.K)
-- End of code segment 2D -- Code segment 3A
/*
This code segment assumes that integer variables @L and @R have been declared
and initialized as follows: @R with the event id of the current retract, and @L
with the event id of the load being retracted.
*/
UPDATE HT
SET R=@R
WHERE L=@L
-- End of code segment 3A -- Code segment 3B
/*
This code segment is written to process retractions of loads from table X.
```

Figure 8C

```
This code segment is written in Transact SQL language of Microsoft SQL Server,
where the copy of table HT that is updated is designated by the alias HT2 from
the first copy of table HT in the FROM clause.
Also, because attribute C is not applicable for loads from table X, it need not
be considered here.
This code segment also assumes that integer variable @L has been declared and
initialized with the event id of the load being retracted.
*/
UPDATE HT
SET A=HT1.A, SA='A'
FROM HT AS HT2, HT AS HT1
WHERE HT1.L=@L
AND HT1.SA='A'
AND HT2.K=HT1.K
AND HT2.L>HT1.L
AND HT2.R IS NULL
AND HT2.SA='C'
AND NOT EXISTS
        (SELECT 1
        FROM HT
        WHERE K=HT2.K
        AND HT1.L<L
        AND L<HT2.L
        AND R IS NULL
        AND SA IN ('A','C'))

UPDATE HT
SET B=HT1.B, SB='A'
FROM HT AS HT2, HT AS HT1
WHERE HT1.L=@L
AND HT1.SB='A'
AND HT2.K=HT1.K
AND HT2.L>HT1.L
AND HT2.R IS NULL
AND HT2.SB='C'
AND NOT EXISTS
        (SELECT 1
        FROM HT
        WHERE K=HT2.K
        AND HT1.L<L
        AND L<HT2.L
        AND R IS NULL
        AND SB IN ('A','C'))
-- End of code segment 3B -- Code segment 4A
/*
This code segment assumes that table Deleted contains rows that were deleted
from T by code segment 1C.
Such table can be computed by application code, or may be made available
automatically by the system, as is the case in Microsoft SQL Server in a DELETE
trigger.
*/
INSERT INTO DT (K, A, B, C)
SELECT K, A, B, C
FROM Deleted
-- End of code segment 4A
```

Figure 8D

```
-- Code segment 4B
/*
This code segment assumes that table Inserted contains rows that were inserted
into T by code segment 1A.
Such table can be computed by application code, or may be made available
automatically by the system, as is the case in Microsoft SQL Server in an INSERT
trigger.
*/
DELETE FROM DT
WHERE EXISTS
        (SELECT 1 FROM Inserted WHERE K=DT.K)
-- End of code segment 4B -- Code segment 5A
/*
This code segment assumes that integer variable @L has been declared and
initialized with the event id of the load being retracted.
*/
DELETE FROM DT
WHERE EXISTS
        (SELECT 1
        FROM HT
        WHERE L=@L
        AND K=DT.K)
-- End of code segment 5A -- Code segment 5B
/*
This code segment assumes specifically the data types given in the example table
declarations above; it also assumes that string '***' is not a legitimate value
that can naturally appear in data.
This code segment also assumes that integer variable @L has been declared and
initialized with the event id of the load being retracted.
This code segment also assumes that the value of attribute L in table HT is
between 0 and 1147483647 inclusive.
*/
INSERT INTO DT (K, A, B, C)
SELECT HT2.K,
    CASE WHEN SubString(Max(
                CASE WHEN HT2.SA!='A'
                     THEN NULL
                     ELSE CAST(1000000000+HT2.L AS
char(10))+IsNull(HT2.A,'***')
                END),10,3)='***'
            THEN NULL
            ELSE SubString(Max(
                CASE WHEN HT2.SA!='A'
                     THEN NULL
                     ELSE CAST(1000000000+HT2.L AS
char(10))+IsNull(HT2.A,'***')
                END),10,3)
    END,
    CASE WHEN SubString(Max(
                CASE WHEN HT2.SB!='A'
                     THEN NULL
                     ELSE CAST(1000000000+HT2.L AS
char(10))+IsNull(HT2.B,'***')
                END),10,3)='***'
```

Figure 8E

```
                THEN NULL
                ELSE SubString(Max(
                        CASE WHEN HT2.SB!='A'
                                THEN NULL
                                ELSE CAST(1000000000+HT2.L AS
char(10))+IsNull(HT2.B,'***')
                        END),10,3)
        END,
        CASE WHEN SubString(Max(
                        CASE WHEN HT2.SC!='A'
                                THEN NULL
                                ELSE CAST(1000000000+HT2.L AS
char(10))+IsNull(HT2.C,'***')
                        END),10,3)='***'
                THEN NULL
                ELSE SubString(Max(
                        CASE WHEN HT2.SC!='A'
                                THEN NULL
                                ELSE CAST(1000000000+HT2.L AS
char(10))+IsNull(HT2.C,'***')
                        END),10,3)
        END
FROM HT AS HT2, HT AS HT1
WHERE HT1.L=@L
AND HT2.K=HT1.K
AND HT2.R IS NULL
GROUP BY HT2.K
HAVING SubString(Max(CAST(1000000000+HT2.L AS char(10))+HT2.SR),11,1)='D'
AND Sum(CASE WHEN HT2.SR='A' THEN 1 ELSE 0 END)>0
-- End of code segment 5B -- Code segment 6A
/*
This code segment assumes that integer variable @L has been declared and
initialized with the event id of the load being retracted.
*/
DELETE FROM T
WHERE EXISTS
        (SELECT 1
        FROM HT
        WHERE L=@L
        AND K=T.K)
-- End of code segment 6A -- Code segment 6B
/*
This code segment assumes specifically the data types given in the example table
declarations above; it also assumes that string '***' is not a legitimate value
that can naturally appear in data.
This code segment also assumes that integer variable @L has been declared and
initialized with the event id of the load being retracted.
This code segment also assumes that the value of attribute L in table HT is
between 0 and 1147483647 inclusive.
*/
INSERT INTO T (K, A, B, C)
SELECT HT2.K,
        CASE WHEN SubString(Max(
                        CASE WHEN HT2.SA!='A'
```

Figure 8F

```
                        THEN NULL
                        ELSE CAST(1000000000+HT2.L AS
char(10))+IsNull(HT2.A,'***')
                    END),10,3)='***'
            THEN NULL
            ELSE SubString(Max(
                    CASE WHEN HT2.SA!='A'
                        THEN NULL
                        ELSE CAST(1000000000+HT2.L AS
char(10))+IsNull(HT2.A,'***')
                    END),10,3)
        END,
        CASE WHEN SubString(Max(
                    CASE WHEN HT2.SB!='A'
                        THEN NULL
                        ELSE CAST(1000000000+HT2.L AS
char(10))+IsNull(HT2.B,'***')
                    END),10,3)='***'
            THEN NULL
            ELSE SubString(Max(
                    CASE WHEN HT2.SB!='A'
                        THEN NULL
                        ELSE CAST(1000000000+HT2.L AS
char(10))+IsNull(HT2.B,'***')
                    END),10,3)
        END,
        CASE WHEN SubString(Max(
                    CASE WHEN HT2.SC!='A'
                        THEN NULL
                        ELSE CAST(1000000000+HT2.L AS
char(10))+IsNull(HT2.C,'***')
                    END),10,3)='***'
            THEN NULL
            ELSE SubString(Max(
                    CASE WHEN HT2.SC!='A'
                        THEN NULL
                        ELSE CAST(1000000000+HT2.L AS
char(10))+IsNull(HT2.C,'***')
                    END),10,3)
        END
FROM HT AS HT2, HT AS HT1
WHERE HT1.L=@L
AND HT2.K=HT1.K
AND HT2.R IS NULL
GROUP BY HT2.K
HAVING SubString(Max(CAST(1000000000+HT2.L AS char(10))+HT2.SR),11,1)='A'
-- End of code segment 6B -- Code segment 7A
/*
This code segment assumes specifically the data types given in the example table
declarations above; it also assumes that string '***' is not a legitimate value
that can naturally appear in data.
This code segment also assumes that integer variables @X and @Y have been
declared and initialized as follows: @Y with the event id of the last step of
the event sub-sequence being considered, and @X with the event id of some event
in that sub-sequence.
```

Figure 8G

```
This code segment also assumes that the value of attribute L in table HT is
between 0 and 1147483647 inclusive.
*/
DELETE FROM T
INSERT INTO T (K, A, B, C)
SELECT K,
       CASE WHEN SubString(Max(
                   CASE WHEN SA!='A'
                       THEN NULL
                       ELSE CAST(1000000000+L AS char(10))+IsNull(A,'***')
                   END),10,3)='***'
            THEN NULL
            ELSE SubString(Max(
                   CASE WHEN SA!='A'
                       THEN NULL
                       ELSE CAST(1000000000+L AS char(10))+IsNull(A,'***')
                   END),10,3)
       END,
       CASE  WHEN SubString(Max(
                   CASE WHEN SB!='A'
                       THEN NULL
                       ELSE CAST(1000000000+L AS char(10))+IsNull(B,'***')
                   END),10,3)='***'
            THEN NULL
            ELSE SubString(Max(
                   CASE WHEN SB!='A'
                       THEN NULL
                       ELSE CAST(1000000000+L AS char(10))+IsNull(B,'***')
                   END),10,3)
       END,
       CASE  WHEN SubString(Max(
                   CASE WHEN SC!='A'
                       THEN NULL
                       ELSE CAST(1000000000+L AS char(10))+IsNull(C,'***')
                   END),10,3)='***'
            THEN NULL
            ELSE SubString(Max(
                   CASE WHEN SC!='A'
                       THEN NULL
                       ELSE CAST(1000000000+L AS char(10))+IsNull(C,'***')
                   END),10,3)
       END
FROM HT
WHERE L<=IsNull(@X,L)
AND IsNull(@Y,2147483646)<IsNull(R,2147483647)
GROUP BY K
HAVING SubString(Max(CAST(1000000000+L AS char(10))+SR),11,1)='A'
-- End of code segment 7A
```

Figure 8H

MAINTAINING AND RECONSTRUCTING THE HISTORY OF DATABASE CONTENT MODIFIED BY A SERIES OF EVENTS

This application claims priority from U.S. Provisional Application No. 60/259,513 filed on Jan. 4, 2001.

BACKGROUND OF THE INVENTION

The invention relates generally to database management. More specifically, the invention relates to a method and system for maintaining the history of database content where the database is modified by a sequence of events.

An institutional database often contains thousands to billions of individual records. An update to an institutional database is often performed through a process termed a load. A load is performed by taking input data from an input table or file and populating the database with the data, where the data in the input and in the database is correlated using a primary key.

Generally, throughout the life of a database, multiple loads are performed. After each load, the database reflects the information populated into the database by the most recent load. When a load is performed, the load may have various effects on the database.

First, the load may insert rows into the database with new key values. Second, the load may update rows with existing key values, but different non-key values. Third, the load may delete rows with those key values, which are not present in the load, but which are present in the database prior to the load.

After a load has been completed, there is generally no way to "undo" the load, other than by restoring the database to some state that it had prior to the load, and then partially repeating the sequence of events performed to arrive at the present database. That is, if the database has been updated with ten loads, and it is realized that the seventh load (or any other load) contained bad data, the only way to undo the seventh load is to start from the state of the database as it existed before the first load, and then repeat loads one through six, followed by loads eight through ten. This process becomes exceedingly difficult when the number or size of loads is large or the need to undo loads is frequent.

It is known that backups of the database may be stored for archival and restore purposes periodically and even after each load. However, with large databases, restoring a database from a previously stored backup and then partially repeating remaining loads just to undo the load may consume an unacceptable amount of time.

Implications of the difficulties of addressing problems with loads are shown through the following example. Data warehousing companies often receive information from multiple data sources and maintain a single database, or data warehouse, containing combined data. However, there is a problem when one of the data suppliers not only stops supplying data, but also informs the data warehousing company that they can no longer use the data that the supplier has previously supplied. In such a case, the loads performed using data received from the supplier must be retracted, such that the database reflects a state as if the retracted load(s) never occurred. It is possible to load an archived copy of the database as it previously existed immediately before the load to be retracted occurred. However, the subsequent sequence of events (with the exception of the retracted loads) must still be performed.

This problem is further aggravated by the fact that each data supplier often provides in its loads only a subset of the information collected by the data warehousing company. For example, while one supplier of demographic data might provide information such as name, address, city, state, zip code, and telephone number, a second supplier might provide name, zip code, age, sex, and race. Data warehousing companies often want to use this data from multiple data suppliers to provide useful information based on the combined data, but are often restricted by one or more suppliers in their use of the data supplied by that individual supplier. Data warehousing companies need an efficient system that can retract data supplied by one or more suppliers on one or more occasions.

There is also a problem when the state of a database just before a load was retracted needs to be known. For instance, a data supplier supplied a load containing bad data. The load containing bad data is discovered, and the load is retracted in a subsequent event. A load containing good data is then performed. However, reports (sent to clients, customers, etc.) may have been generated based on the bad data before the load with the bad data was retracted. In such a case, the database manager may want to duplicate the reports based on the bad data for audit or management purposes. Presently, there is no way to do this other than to reconstruct the database using the initial sequence up to and including the load containing bad data, as load retractions cannot subsequently be ignored. Thus, an improved database load management method and system is needed that addresses the above shortcomings.

BRIEF SUMMARY OF THE INVENTION

In some aspects of the invention, a method of tracking changes to the content of a database comprising a set of steps is disclosed. Data is stored in a database, a plurality of loads to the database are performed, and at least one of the plurality of loads is undone such that the resulting content of the database reflects the data as if the undone load had not been performed.

In other aspects of the invention, a system for tracking changes to the content of a database is disclosed. The system includes a processor and a memory. The memory stores at least one of a database and/or computer readable instructions such that when the computer readable instructions are executed by the processor the system is adapted to perform a set of steps. Data is stored in the database, a plurality of loads to the database are performed, and at least one of the plurality of loads is undone such that the resulting content of the database reflects the data as if the undone load had not been performed.

In some embodiments, the undoing step is ignored such that the resulting content of the database reflects data as if the previously undone load did occur.

In some embodiments, a table structure of a table in a first load is different from a table structure in a second load.

In some embodiments, database table rows and load table rows are correlated via a primary key.

In some embodiments, performing a load includes a set of steps. Rows are inserted into the target when the rows have new key values not already present in the target. Rows are updated in the target when the rows have existing key values already present in the target.

Rows are deleted from the target when an existing row in the target does not have a key value present in the load table.

In some embodiments, when inserting a row with a primary key which at some point in the past was deleted prior to said load, those columns for which the load does not contain data are set to the values that they had when the row was last deleted.

Some embodiments reconstruct a load sequence of the target table as it existed just before a load retraction. Some embodiments then reconstruct a historical state of the target table at a discrete time in the load sequence. The reconstructing may be performed based at least in part on modification information in a second table.

BRIEF DESCRIPTION OF THE SEVERAL VIEWS OF THE DRAWING

FIG. 1 shows a sequence of events that may be used to modify a table in accordance with embodiments of the present invention.

FIG. 2A shows a table immediately after being modified by the first event shown in FIG. 1.

FIG. 2B shows a table immediately after being modified by the first two events shown in FIG. 1.

FIG. 2C shows a table immediately after being modified by the first three events shown in FIG. 1.

FIG. 2D shows a table immediately after being modified by the first four events shown in FIG. 1.

FIG. 2E shows a table immediately after being modified by the first five events shown in FIG. 1.

FIG. 2F shows a table immediately after being modified by the first six events shown in FIG. 1.

FIG. 2G shows a table immediately after being modified by the all seven events shown in FIG. 1.

FIG. 3 shows historical states of a table that may be reconstructed from a first subsequence of events including Steps 1 through 7 shown in FIG. 1.

FIG. 4 shows historical states of a table that may be reconstructed from a second subsequence of events including Steps 1 through 5 shown in FIG. 1.

FIG. 5 shows historical states of a table that may be reconstructed from a third subsequence of events including Steps 1 through 3 shown in FIG. 1.

FIG. 6A shows the states of tables HT and DT immediately after the first event shown in FIG. 1.

FIG. 6B shows the states of tables HT and DT immediately after the second event shown in FIG. 1.

FIG. 6C shows the states of tables HT and DT immediately after the third event shown in FIG. 1.

FIG. 6D shows the states of tables HT and DT immediately after the fourth event shown in FIG. 1.

FIG. 6E shows the states of tables HT and DT immediately after the fifth event shown in FIG. 1.

FIG. 6F shows the states of tables HT and DT immediately after the sixth event shown in FIG. 1.

FIG. 6G shows the states of tables HT and DT immediately after the seventh event shown in FIG. 1.

FIG. 8A shows a first portion of source code for use in one embodiment of the invention.

FIG. 8B shows a second portion of source code, continued from FIG. 8A, for use in one embodiment of the invention.

FIG. 8C shows a third portion of source code, continued from FIG. 8B, for use in one embodiment of the invention.

FIG. 8D shows a fourth portion of source code, continued from FIG. 8C, for use in one embodiment of the invention.

FIG. 8E shows a fifth portion of source code, continued from FIG. 8D, for use in one embodiment of the invention.

FIG. 8F shows a sixth portion of source code, continued from FIG. 8E, for use in one embodiment of the invention.

FIG. 8G shows a seventh portion of source code, continued from FIG. 8F, for use in one embodiment of the invention.

FIG. 8H shows a eighth portion of source code, continued from FIG. 8G, for use in one embodiment of the invention.

DETAILED DESCRIPTION OF THE INVENTION

Figure 7:
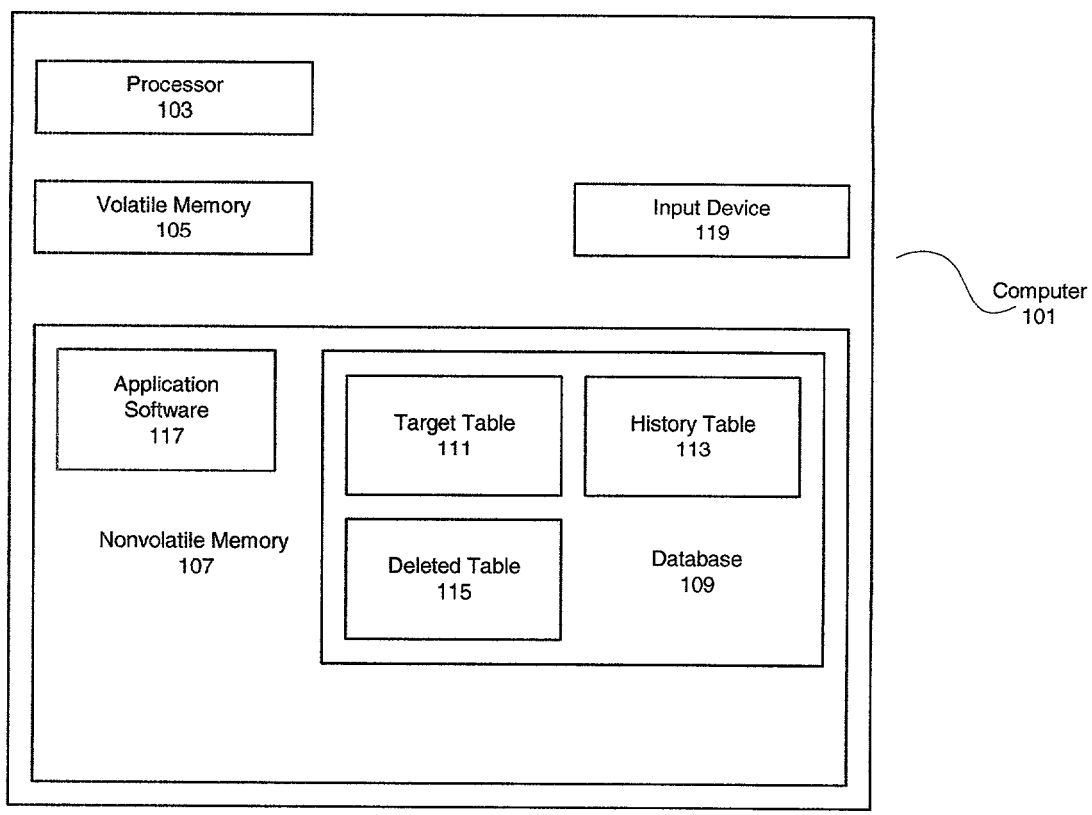
FIG. 7 shows a block diagram of a general purpose computer adapted to perform one or more embodiments of the invention.

Aspects of the invention may be embodied in a method and system for maintaining the history of database content when the database is modified by a sequence of events, where each event may be one of a load or a load retraction, and for reconstructing the state of the database at a discrete point in its event history.

A load occurs when a table of input data is incorporated into a target table. Each table may have a primary key, which is a minimal set of attributes that uniquely identify rows.

A primary key may be a single attribute, or it may be a combination of multiple attributes. An attribute is a field in the table. For example, in a table containing information about people, attributes may include information related to a person's last name, first name, height, age, etc., while a last name attribute may also be the primary key. However, because many people often share a common last name, the combination of last name and first name, or any other combination, may instead be the primary key.

While data received during loads is generally stored in tables, other data structures such as trees, linked lists, and the like may be used.

The load table may or may not have the same table structure as the target table. When a load occurs, because load tables may have non-uniform structures, it is possible that the load may contain data for some columns in the target table and not for others. Rows in the target table and in the load table are correlated via the primary key. Modifying a target table by performing a load generally has the result of inserting into the target table those rows from the load table with new key values (i.e., those rows whose key values are present in the load table but not in the target table); updating in the target table those rows with existing key values (i.e., finding rows whose key values are present both in the target table and in the load, and updating non-key attributes of these rows in the target table with the corresponding values from the corresponding rows in the load table); and, deleting from the target table those rows with missing key values (i.e., those rows whose key values are present in the target table but are not present in the load table).

In one aspect, the load table replaces the target table with the exception of values for those columns in the rows being updated for which the load does not contain any data. In some embodiments, loads include only inserts and updates. In other embodiments, loads perform a delete only when the load explicitly includes a delete instruction.

It is possible to delete a row during one event, and later add a row with the same key value as the deleted row in a later event. Loads may contain non-uniform table structures, each of which also differs from the target table structure. As a result, when inserting a row with a key value not currently present in the target table, but which at some point in the past was present in the target table but was deleted prior to the present load, those columns in the target table for which the load does not contain data are set to the values that they had when the row was last deleted from the target table. In another embodiment, the information from previously deleted rows is not reinserted into the table; only the information contained in the load is added.

Marking a load as retracted results in reconstructing the current and historical states of the target table as if that load had not occurred, i.e., as if that load was not one of the loads in the sequence.

Tables are often represented by the nomenclature T(K, A, B, C), where T is the table name, K is a single attribute or a set of attributes, and A, B and C are attributes. K is the primary key, designated by the underlining.

For purposes of illustration, a table modified by a sequence of events is now provided, where each event is either a load or a load retraction.

Let target table T have the structure T(K, A, B, C), and let all loads come from two tables, X(K, A, B) and Y(K, B, C). Table T is initially empty, and is modified by the sequence of events shown in FIG. 1.

Using the present invention, table T should change in the following way during and after each step in the example sequence.

After Step 1: Because both rows are new (table T is initially empty), both are inserted into T. Because table X does not provide data for attribute C and because rows with K=k1 or K=k2 were never in T previously, NULL is used as their value for attribute C. FIG. 2A depicts table T immediately after step 1.

After Step 2: Because there is a row with K=k1 in T, it is updated to have a new value for attribute A (a12) and attribute B (b12). Because the row with K=k2 is present in T but not present in X, this row is deleted from T. Because the row with K=k3 is present in X but not present in T, it is inserted into T. Because this row was never in T previously, the value NULL is used as the value for its C attribute. FIG. 2B depicts table T immediately after step 2.

After Step 3: Because there is a row with K=k1 in T, it is updated to have a new value for attribute C (c11). Because the row with K=k3 is present in T but not present in Y, it is deleted from T. FIG. 2C depicts table T immediately after step 3.

After Step 4: Because there is a row with K=k1 in T, it is updated to have a new value for attribute C (c12). Because the row with K=k2 is present in Y but not present in T, it is inserted into T. However, because there was a row with K=k2 previously, which was deleted in Step 2, the value for attribute A in the newly inserted row is set to what it was in that deleted row, namely a21. FIG. 2D depicts table T immediately after step 4.

After Step 5: Marking the load of Step 2 as retracted means that T should be reconstructed the way it would have been had that load never been part of the event sequence. That is, the table should reflect the sequence of events shown in FIG. 2E.

This results in a different value for the A attribute in the row with K=k1. This is because it was the load of Step 2 which had changed A value a11 in the row with K=k1 to value a12, and the load of Step 2 is now viewed as never having taken place.

After Step 6: Marking the load of Step 1 as retracted means that T should be reconstructed the way it would have been had that load also never been part of the load sequence. Because Step 5 had already marked as retracted the load of Step 2, neither of these loads are now viewed as part of the event sequence. That is, the table T should reflect the sequence of events shown in FIG. 2F.

This results in two different values for attribute A. This is because both the load of Step 1 and the load of Step 2 are now viewed as never having happened; thus, the A-values are considered to have been never set.

After Step 7: Because there is a row with K=k1 in T, it is updated to have a new value for attribute A (a11). Because the row with K=k2 is present in T but not present in X, it is deleted from T. FIG. 2G depicts table T immediately after Step 7.

In one embodiment, a system maintains the state of table T as described in the above example, without requiring that the sequence of events be re-performed to reconstruct a historical state of the target table or to ignore a load. Additionally, the system may allow events in any proper prefix sub-sequence of the load and load retraction event sequence to be viewed as the only events that had occurred, and then used to reconstruct the state of table T as it would have been just after any event in that sub-sequence.

For example, in the above exemplary event sequence let the sub-sequence be the entire sequence of events 1 through 7. As of completion of event 7, both loads of Steps 2 and 1 have been marked as retracted, and the only remaining loads are those of Steps 3, 4 and 7.

The method and system may reconstruct the historical states of table T shown in FIG. 3.

As a second example, let the sub-sequence be the events 1 through 5. As of completion of event 5, only the load of Step 2 has been marked as retracted, and the load of Step 7 had not yet happened. Thus, the remaining loads are those of Steps 1, 3, and 4. The method and system may reconstruct the historical states of table T shown in FIG. 4

As yet another example, let the sub-sequence be the events 1 through 3. As of completion of event 3, none of the loads of Steps 1, 2 or 3 has been marked as retracted, and the loads of Steps 4 and 7 have not yet happened. Thus, the remaining loads are those of Steps 1, 2, and 3. The method and system may reconstruct the historical states of table T shown in FIG. 5.

To support the above-described functionality for table T, at least some of the embodiments identify loads and load retractions. In addition to a target table T, a history table HT may be maintained. Table HT contains a history of all inserts, updates, deletes and retractions that have been executed on table T. A second table DT may also be maintained. Table DT contains rows not currently present in T, but which have previously been present in T. Table DT may be maintained to enhance the efficiency of reconstructing the current state of T. However, because table DT can itself be reconstructed from table HT, the method and system can be easily modified to reconstruct the current state of table T from table HT alone. Thus table DT is optional. Specific rules are provided for maintaining tables T, HT and DT.

The rules for identifying loads and load retractions, the structure of tables HT and DT, and the rules for maintaining tables T, HT and DT are herein described. The rules may be modified to achieve different results. FIGS. 8A through 8H, collectively referred herein as FIG. 8, show portions of source code that may be used to implement aspects of the invention as described below. In one embodiment, the source code is written in SQL. However, other programming languages may also be used to support the various embodiments as described herein.

Rules for identifying loads and load retractions are shown below. Each load and each load retraction executed on T may be assigned a unique increasing integer event ID from a common sequence. In the provided examples, the step number may be used as the event ID of the loads and load retractions. Each load retraction identifies the event ID of the load it is marking as retracted.

Applicability of attributes may be defined as follows. Each attribute A in T may be referred to as "data attribute." Data attributes which are part of T's primary key may be referred to as "primary key data attributes;" data attributes which are not part of T's primary key may be referred to as "non-primary key data attributes." While a load generally contains data for all primary key data attributes, it may omit data for one or more non-primary key data attributes in T. Such omitted attributes may be referred to as "non-applicable data attributes" for that load. The rest of the non-primary key attributes may be referred to as "applicable data attributes." The method may require a priori knowledge of which attributes are key attributes for T, and which attributes are applicable and which are non-applicable for each load.

Rules for maintaining the various tables may be as follows, with reference to the source code in FIG. 8, where applicable. When table T is modified by a load from table X, it may be modified in accordance with the following three rules:

1. With reference to code segment 1A in FIG. 8, when table X contains a row <x>, such that T does not contain a row with the same primary key, then a corresponding row <r> is inserted into T. In this row <r>:
1.a. All primary key data attributes are set to their corresponding values in <x>;
1.b. All applicable data attributes are set to their corresponding values in <x>;
1.c. all non-applicable data attributes are set as follows:
1.i. If table DT contains a row <dr> with the same primary key, then they are set to their corresponding values in <dr>;
1.ii. If table DT does not contain a row with the same primary key, then they are set to NULL.
2. With reference to code segment 1B in FIG. 8, when table X contains a row <x>, such that T does contain a row <r> with the same primary key, then every applicable data attribute A in <r> is set to its corresponding value in <x>.
3. With reference to code segment 1C in FIG. 8, when table T contains a row <r>, such that X does not contain a row with the same primary key, then row <r> is deleted from T.

Rules for processing a load retraction, as well as rules for maintaining table DT (mentioned above) are described below. Rules for maintaining table HT are also provided. The structure of HT is such that:

1. For each attribute A in T, there is an attribute also named A in HT. Such attributes may also be referred to as "data attributes" in HT. Data attributes which are part of T's primary key will be referred to as "primary key data attributes" in HT; data attributes which are not part of T's primary key will be referred to as "non-primary key data attributes" in HT.
2. For each non-primary key data attribute A, there may be an attribute SA in HT. Such attributes are referred to as the "column status attributes" in HT. The purpose of attribute SA is to describe the status of the value for A; it may have one of four values: 'A', 'C', 'D' or 'N', standing for "actual," "confirmed," "deleted" and "not applicable," respectively.
3. There may be an attribute SR in HT. This attribute may be referred to as the "row status attribute" in HT. The purpose of attribute SR is to describe the status of the entire row; it may have one of two values: 'A', or 'D', standing for "active," and "deleted," respectively.
4. There may be an attribute L in HT. The purpose of attribute L is to identify which load in the sequence caused the row to appear in HT. The primary key of HT is comprised of all primary key data attributes plus attribute L.
5. There may be an attribute R in HT. The purpose of attribute R is to identify which load retraction event marked as retracted the load which originally caused the row to appear in HT.

When table T is modified by a load, table HT may be modified in accordance with the following four rules:

1. With reference to code segment 2A in FIG. 8, when a data row <r> is inserted into T, then a corresponding historical row <hr> is inserted into HT. In this row <hr>:
1.a. all primary key data attributes are set to their corresponding values in <r>;
1.b. all applicable data attributes are set to their corresponding values in <r>, and their corresponding column-status attributes are set to 'A';
1.c. all non-applicable data attributes are set to NULL, and their corresponding column-status attributes are set to 'N';
1.d. row status attribute SR is set to 'A';
1.e. attribute L is set to the event ID of the load inserting <r> into T;
1.f. attribute R is set to NULL.
2. With reference to code segment 2B in FIG. 8, when a data row <r> is updated in T, then a corresponding historical row <hr> is inserted into HT. In this row <hr>:
2.a. all primary key data attributes are set to their corresponding values in <r>;
2.b. all applicable data attributes for which values have actually changed as the result of the update are set to their corresponding values in <r>, and their corresponding column-status attributes are set to 'A';
2.c. all applicable data attributes for which values have not changed as the result of the update are set to NULL, and their corresponding column-status attributes are set to 'C';
2.d. all non-applicable data attributes are set to NULL, and their corresponding column-status attributes are set to 'N';
2.e. row status attribute SR is set to 'A';
2.f. attribute L is set to the event ID of the load updating <r> in T;
2.g. attribute R is set to NULL.
3. With reference to code segment 2C in FIG. 8, when a data row <r> is deleted from T, then a corresponding historical row <hr> is inserted into HT. In this row <hr>:
3.a. all primary key data attributes are set to their corresponding values in <r>;
3.b. all non-primary key data attributes are set to NULL, and their corresponding column-status attributes are set to 'D';
3.c. row status attribute SR is set to 'D';
3.d. attribute L is set to the event ID of the load deleting <r> from T;
3.e. attribute R is set to NULL.
4. With reference to code segment 2D in FIG. 8, when table DT contains a row <dr>, such that the load does not have a row with the same primary key as <dr>, then a corresponding historical row <hr> is inserted into HT. In this row <hr>:
4.a. all primary key data attributes are set to their corresponding values in <dr>;
4.b. all non-primary key data attributes are set to NULL, and their corresponding column-status attributes are set to 'D';

4.c. row status attribute SR is set to 'D';
4.d. attribute L is set to the event ID of the load;
4.e. attribute R is set to NULL.

When a load with event ID N, which has been processed against table T, is marked as retracted by a load retraction with event ID M, table HT may be modified in accordance with the following two rules:

1. With reference to code segment 3A in FIG. 8, in every row <hr> in HT with L-value of N, attribute R is set to value M;
2. With reference to code segment 3B in FIG. 8, in every row <hr> in HT with L-value of N, for each column status attribute SA for which row <hr> has value 'A', another row <hr2> in HT is attempted to be found, where:
2.a. <hr2> have the same primary key (ignoring attribute L) as <hr>;
2.b. L-value in <hr2> is greater than L-value in <hr>;
2.c. <hr2> has value NULL for attribute R;
2.d. <hr2> has value 'C' for the column status attribute SA;
2.e. there do not exist any rows in HT with:
2.e.i. the same primary key (ignoring attribute L) as <hr>;
2.e.ii. L-value between the L-value of <hr> and the L-value of <hr2>, excluding the boundary values;
2.e.iii. value NULL for attribute R; and
2.e.iv. value of 'A' or 'C' for the column status attribute SA.
2.f. If such row <hr2> is found, then attribute A in <hr2> is set to the value of A in <hr>.

Table DT may be maintained as follows. The structure of table DT may be such that:

1. For each attribute A in T, there is an attribute also named A in DT.
2. The primary key of DT is the same as the primary key of T.

When table T is modified by a load, table DT may be modified in accordance with the following two rules:

1. With reference to code segment 4A in FIG. 8, when a data row <r> is deleted from T, then a corresponding row <dr> is inserted into DT. In this row <dr>, all attributes are set to their corresponding values in <r>;
2. With reference to code segment 4B in FIG. 8, when a data row <r> is inserted into T, then if DT contains a row <dr> with the same primary key as <r>, then this row <dr> is deleted from DT.

When a load with event ID N, which has been processed against table T, is marked as retracted by a load retraction with event ID M, table DT may be modified in accordance with the following rules:

For every row <hr> in HT whose L-value is N, the following three actions may be taken:

1. With reference to code segment 5A in FIG. 8, if table DT contains a row <dr> with the same primary key as <hr>, then row <dr> is deleted from DT.
2. With reference to code segment 5B in FIG. 8, another row <hr2> in table HT is attempted to be found, where
2.i. <hr2> has the same primary key (ignoring attribute L) as <hr>;
2.ii. <hr2> has value NULL for attribute R;
2.iii. <hr2> has the largest L-value, such that conditions 1 and 2 immediately above are satisfied.
3. If such row <hr2> is found, and if it has value 'D' for the row status attribute SR, and if table HT contains some row <hr3>, where
3.IF.a. <hr3> has the same primary key (ignoring attribute L) as <hr>;
3.IF.b. <hr3> has value NULL for attribute R; and
3.IF.c. <hr3> has value 'A' for the status attribute SR, then a new row <dr2> is inserted into DT. In this row <dr2>:

3.THEN.a. all primary key data attributes are set to their corresponding values in <hr>;
3.THEN.b. for every non-primary data attribute A, another row <hr4> in HT is attempted to be found, where:
3.THEN.b.i. <hr4> has the same primary key (ignoring attribute L) as <hr>;
3.THEN.b.ii. <hr4> has value NULL for attribute R;
3.THEN.b.iii. <hr4> has value 'A' for the column status attribute SA;
3.THEN.b.iv. <hr4> has the largest L-value, such that conditions 3.THEN.b.i, 3.THEN.b.ii, and 3.THEN.b.iii immediately above are satisfied.
3.THEN.c. If such row <hr4> is found, then attribute A in <dr2> is set to the value of A in <hr4>; else, it is set to NULL.

The above-described rules for maintaining tables HT and DT may be illustrated in an example demonstrating how tables HT and DT are maintained by considering the seven step sequence of loads and load retractions shown in FIG. 1. Table HT is presented ordered by K, and then by L. The states of tables HT and DT immediately after steps 1–7 are shown in FIGS. 6A–6G, respectively.

FIG. 6A shows the states of tables HT and DT immediately after step 1. FIG. 6B shows the states of tables HT and DT immediately after step 2. Because the row with K=k2 was deleted from T, the corresponding row <k2, a21, b21, NULL> is added to table DT in step 2.

FIG. 6C shows the states of tables HT and DT immediately after step 3. Because there was a row with K=k2 in table DT, which was not present either in the load of Step 3 or in table T, the corresponding row <k2, D, NULL, D, NULL, D, NULL, D,3,NULL> is added to table HT in step 3. Also, because the row with K=k3 was deleted from T, the corresponding row <k3, a31, b31,NULL> is added to table DT.

FIG. 6D shows the states of tables HT and DT immediately after step 4. Because the load of Step 4 contained a row with K=k2, the corresponding row with K=k2 was deleted from table DT in step 4. Also, because there was a row with K=k3 in table DT, which was not present either in the load of Step 4 or in table T, the corresponding row <k3,D,NULL, D,NULL,D,NULL,D,4,NULL> was added to table HT.

FIG. 6E shows the states of tables HT and DT immediately after step 5. In the rows with L=2, the R attribute was set to 5. The row with K=k1 and L=2 satisfies the requirements of the rules for modifying table HT after processing a load retraction with respect to the status attribute SB. Thus, attributes B and SB in the row with K=k1 and L=3 are changed (shown in bold in FIG. 6E).

Because the row with K=k3 in HT was marked as retracted in this step, the row with K=k3 is deleted from DT. Furthermore, even though of the two rows in HT with K=k3 and R=NULL, the one with the largest L-value (L=4) has value 'D' for its attribute SR, table HT does not have any rows with K=k3, SR='A' and R=NULL. Thus, this row is not reinserted into DT. The row with K=k3 is treated as if it had never existed; thus, it is not viewed as having been actively deleted, and therefore is not inserted into table DT, leaving table DT empty.

FIG. 6F shows the states of tables HT and DT immediately after step 6. In step 6, the R attribute of both rows with L=1 is set to 6.

The final states of tables HT and DT after step 7 are shown in FIG. 6G. Because the row with K=k2 was deleted from T, the corresponding row <k2,NULL,b22,c22> was added to table DT.

Aspects of the invention use rules for processing load retractions on table T, which are now provided. When a load with event ID N, which has been processed against table T, is marked as retracted by a load retraction with event ID M, table T is modified in accordance with the following rules.

For every row <hr> in HT whose L-value is N, the following two actions may be taken:
1. With reference to code segment 6A in FIG. 8, if table T contains a row <r> with the same primary key (ignoring attribute L) as <hr>, then row <r> is deleted from T.
2. With reference to code segment 6B in FIG. 8, another row <hr2> in table HT is attempted to be found, where
2.a. <hr2> has the same primary key (ignoring attribute L) as <hr>;
2.b. <hr2> has value NULL for attribute R;
2.c. <hr2> has the largest L-value, such that conditions 2.a and 2.b immediately above are satisfied.
2.d. If such row <hr2> is found, and if it has value 'A' for the row status attribute SR, then a new row <r2> is inserted into T. In this row <r2>:
2.d.i. all primary key data attributes are set to their corresponding values in <hr>;
2.d.ii. for every non-primary data attribute A, another row <hr3> in HT is attempted to be found, where:
2.d.ii.1.<hr3> has the same primary key (ignoring attribute L) as <hr>;
2.d.ii.2.<hr3> has value NULL for attribute R;
2.d.ii.3.<hr3> has value 'A' for the column status attribute SA;
2.d.ii.4<hr3> has the largest L-value, such that conditions 2.d.ii.1, 2.d.ii.2 and 2.d.ii immediately above are satisfied.
2.d.iii. If such row <hr3> is found, then attribute A in <r2> is set to the value of A in <hr3>; else, it is set to NULL.

As stated above, the method and system allow any proper prefix sub-sequence of the load and load retraction event sequence to be used to reconstruct the state of table T as it would have been just after any event in that sub-sequence. The rules for reconstructing the state of table T just after the load with event ID N in a sub-sequence whose last step has event ID M (N≦M), are as follows:

First, with reference to code segment 7A in FIG. 8, table T is emptied. Then, for every distinct primary key <pk> (ignoring attribute L) in HT, a row <hr> in table HT is attempted to be found according to the following four factors:
1. <hr> has the same primary key (ignoring attribute L) as <pk>;
2. <hr> has R-value of NULL or of Z, where Z>M (the second condition means that even though the load that placed <hr> into HT has been marked as retracted, the retraction itself happened after step with ID M, and is therefore not considered in this event sub-sequence);
3. <hr> has L-value less than or equal to N (this condition means that only those loads with event IDs up to and including N are considered to have occurred);
4. <hr> has the largest L-value, such that conditions 1, 2 and 3 immediately above are satisfied.

If such row <hr> is found, and if it has value 'A' for the row status attribute SR, then a new row <r> is inserted into T. In this row <r>, the following two actions may be taken:
1. all primary key data attributes are set to their corresponding values in <pk>;
2. for every non-primary data attribute A, another row <hr2> in HT is attempted to be found according to the following five factors:
2.a. <hr2> has the same primary key (ignoring attribute L) as <pk>;
2.b. <hr2> has R-value of NULL or of Z, where Z>M;
2.c. <hr2> has L-value less than or equal to N;
2.d. <hr2> has value 'A' for the column status attribute SA;
2.e. <hr2> has the largest L-value, such that conditions 2.a, 2.b, 2.c and 2.d immediately above are satisfied.

If such row <hr2> is found, then attribute A in <r> is set to the value of A in <hr2>; else, it is set to NULL.

By setting N and M to the event ID of the latest load and/or load retraction event that has actually occurred, the above rules will reconstruct the current state of table T.

As has been described above, the present invention may be used to maintain and reconstruct the history of a table modified by a series of events, where each event is either a load or a load retraction. With reference to FIG. 7, The invention may be implemented in a conventional computer 101 comprising a processor 103, input device 119, volatile memory 105, and non-volatile memory 107, such as a hard disk, optical storage, or the like. A working database 109 and application software 117 are stored in the non-volatile memory. Target table (T) 111, history table (HT) 113, deleted table (DT) are stored in the working database. A computer with substantial processing power is desirable to process large tables and databases faster. However, any conventional computer may be used.

The application software 117 contains computer readable instructions, such that when executed by the processor 103, adapts the computer to perform according to the aforementioned rules. Load table data may be input using input device 119, such as a network connection, removable disk, infrared port, CD-ROM, DVD-ROM, or the like. Optionally, load data may be stored separately in non-volatile memory 107 before performing the load. It should also be appreciated by those skilled in the art that a database may be stored across more than one storage device, or that one database may include one or more other databases consisting of one or more data tables each.

The above described system and method may be used to maintain a database throughout a series of events, where each event is a load or a load retraction, without being required to repeat the series of events each time a load is retracted. The system and method may also be used to maintain a database accepting input (loads) from non-uniform data structures, to retract loads previously performed on the database, and to reconstruct a historical state of a database or a database table, where the database being manipulated has a large number of records.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What we claim is:
1. A method of undoing changes made to the content of at least one database, comprising the steps of:
   (1) storing data in a database;
   (2) performing a plurality of loads to said database, wherein the load data comprises a load table and the database comprises a target table, and wherein the database table rows and the load table rows are correlated via a primary key; and
   (3) undoing at least one of said plurality of loads, wherein the resulting content of the database reflects the data as if the undone load had not been performed, and wherein performing a load in step (2) comprises the steps of:
i. inserting rows into the target with new key values;
ii. updating rows in the target table with existing key values; and
iii. deleting rows from the target table when a row's key value does not exist in the load table,
wherein during step (2) i., when inserting a row with a primary key which at some point in the past was deleted prior to said load, those columns for which the load does not contain data are set to the values that they had when the row was last deleted.

2. The method of claim 1, further comprising the step of:
(4) reconstructing a load sequence of said database as it existed prior to step (3),
wherein, subsequent to step (3), the resulting content of the database reflects the data as if the undone load had not been performed and, subsequent to step (4), the resulting content of the database reflects the data as if the one of said plurality of loads had been performed.

3. The method of claim 1, further comprising the step of:
(4) recording information in a history table, separate from said target table, wherein said information corresponds to each modification made to said target table.

4. The method of claim 3, further comprising the step of:
(5) reconstructing a historical state of said target table at a discrete time in said load sequence, wherein said reconstructing is performed based at least in part on the information in the history table.

5. The method of claim 1, wherein a table structure of a table in a first load is different from a table structure of a table in a second load.

6. A system for undoing changes made to the content of at least one database, comprising:
a processor; and
a memory;
wherein in the memory is stored a database and computer readable instructions such that when the computer readable instructions are executed by the processor the system is adapted to perform the steps of:
(1) storing data in a database;
wherein during step (2) i., when inserting a row with a primary key which at some point in the past was deleted prior to said load, those columns for which the load does not contain data are set to the values that they had when the row was last deleted.

7. The system of claim 6, wherein the computer readable instructions further cause the system to perform the step of:
(4) reconstructing a load sequence of said database as it existed prior to step (3),
wherein, subsequent to step (3), the resulting content of the database reflects the data as if the undone load had not been performed and, subsequent to step (4), the resulting content of the database reflects the data as if the one of said plurality of loads had been performed.

8. The system of claim 6, wherein the computer readable instructions further cause the system to perform the step of:
(4) recording information in a history table, separate from said target table, wherein said information corresponds to each modification made to said target table.

9. The system of claim 8, wherein the computer readable instructions further cause the system to perform the step of:
(5) reconstructing a historical state of said target table at a discrete time in said load sequence, wherein said reconstructing is performed based at least in part on the information in the history table.

10. The system of claim 6, wherein a table structure of a table in a first load is different from a table structure of a table in a second load.

11. A computer readable medium storing computer readable instructions that, when executed by a processing unit, cause a data processing device to undo changes made to the content of at least one database by performing the steps of:
(1) storing data in a database;
(2) performing a plurality of loads to said database, wherein the load data comprises a load table and the database comprises a target table, and wherein the database table rows and the load table rows are correlated via a primary key; and
(3) undoing at least one of said plurality of loads;
wherein the resulting content of the database reflects the data as if the undone load had not been performed, and
wherein performing a load in step (2) comprises the steps of:
i. inserting rows into the target with new key values;
ii. updating rows in the target table with existing key values; and
iii. deleting rows from the target table when a row's key value does not exist in the load table
wherein during step (2) i., when inserting a row with a primary key which at some point in the past was deleted prior to said load, those columns for which the load does not contain data are set to the values that they had when the row was last deleted.
wherein, subsequent to step (3), the resulting content of the database reflects the data as if the undone load had not been performed and, subsequent to step (4), the resulting content of the database reflects the data as if the one of said plurality of loads had been performed.

12. The computer readable medium of claim 11, wherein the computer readable instructions further cause the data processing device to perform the step of:
(4) reconstructing a load sequence of said database as it existed prior to step (3),
wherein, subsequent to step (3), the resulting content of the database reflects the data as if the undone load had not been performed and, subsequent to step (4), the resulting content of the database reflects the data as if the one of said plurality of loads had been performed.

13. The computer readable medium of claim 11, wherein the computer readable instructions further cause the data processing device to perform the step of:
(4) recording information in a history table, separate from said target table, wherein said information corresponds to each modification made to said target table.

14. The computer readable medium of claim 13, wherein the computer readable instructions further cause the data processing device to perform the step of:
(5) reconstructing a historical state of said target table at a discrete time in said load sequence, wherein said reconstructing is performed based at least in part on the information in the history table.

15. The computer readable medium of claim 11, wherein a table structure of a table in a first load is different from a table structure of a table in a second load.

* * * * *

UNITED STATES PATENT AND TRADEMARK OFFICE
CERTIFICATE OF CORRECTION

PATENT NO. : 6,959,301 B2  Page 1 of 1
DATED : October 25, 2005
INVENTOR(S) : David Rozenshtein et al.

It is certified that error appears in the above-identified patent and that said Letters Patent is hereby corrected as shown below:

Column 13,
Line 42, insert the following:
-- (2)　performing a plurality of loads to the database, wherein the load comprises a load table and the database comprises a target table, and wherein the database table rows are correlated via a primary key; and
(3)　undoing at least one of said plurality of loads,
　　wherein performing a load in step (2) comprises the steps of:
i.　inserting rows into the target with new key values;
ii.　updating rows in the target table with existing key values; and
iii.　deleting rows from the target table when a row's key value does not exist in the load table,
wherein the resulting content of the database reflects the data as if the undone load had not been performed, and --.

Column 14,
Lines 31-36, remove the following:
"wherein, subsequent to step (3), the resulting content of the database reflects the data as if the undone load had not been performed and, subsequent to step (4), the resulting content of the database reflects the data as if the one of said plurality of loads has been performed.".

Signed and Sealed this

Thirteenth Day of June, 2006

JON W. DUDAS
*Director of the United States Patent and Trademark Office*